Patented Dec. 4, 1945

2,390,191

UNITED STATES PATENT OFFICE 2,390,191

PHOSPHATE GLASS

John E. Stanworth, Sheffield, England, assignor to General Electric Company, a corporation of New York No Drawing. Application March 12, 1945, Serial No. 582,417. In Great Britain July 26, 1944

3 Claims. (Cl. 106—47)

This invention relates to glasses having properties which render them useful for various purposes.

It is well known that it is almost impossible to join together by fusion two parts constituted of glass, without distorting the parts adjacent the joint. It is also well known that to make satisfactory seals between glass and metal or ceramic materials or even between two glasses, it is necessary (if there are not to be strict limitations to the relative dimensions of the various parts) that the coefficient of thermal expansion of the glass and the surface to which it adheres should be closely matched, since otherwise strains are set up which may result in fracture of the glass.

The present invention provides a new range of glasses of suitable coefficient of expansion, which may be used for the purpose of joining together two parts made in another glass without any distortion of these parts, and for other purposes hereinafter referred to.

A glass composition according to the invention comprises $P_2O_5$ 28–38%; $Al_2O_3$ 8–16%; $B_2O_3$ 13–22%; $ZnO+MgO+BaO$ 24–34%; $Na_2O$ 6–10%; the molecular ratio of $P_2O_5$ to $Al_2O_3$ being within the range 1.5 to 3.0. It is preferable that the following limitations should also be made: ZnO 3–9%; MgO 6–18%; BaO 0–18%.

The necessary softness of these glasses is obtained by incorporating a high percentage of phosphorus pentoxide and boric oxide as glass forming constituents. However, I find there is a limit set to the introduction of these oxides by other important factors, particularly durability and avoidance of devitrification during working and forming. To aid durability I introduce between 8 and 16% alumina which I find does not make the glass too hard for my purpose.

For the remaining oxides I have used mainly divalent oxides, restricting the total soda content to 10% in order to maintain good durability. I also find that the high content of divalent oxide promotes good flame working properties.

A preferred composition is as follows:

| | |
|---|---|
| $P_2O_5$ | 33.5 |
| $Al_2O_3$ | 15.5 |
| $B_2O_3$ | 14.0 |
| MgO | 12.4 |
| BaO | 9.6 |
| ZnO | 7.0 |
| $Na_2O$ | 8.0 |

This glass has an expansion coefficient of approximately $90 \times 10^{-7}$.

Two parts consisting of certain silicate glasses having a thermal expansion characteristic of approximately the same value as that of the new range of glasses can be fusion welded together by an intermediate glass having a composition within the range above specified without distorting the silicate glass parts, owing to the lower softening temperature of the new soft phosphate glasses. A suitable silicate glass is the soda-lime-magnesia-silica glass normally used in the manufacture of electric lamp bulbs and having the following main constituents: $SiO_2$ 71.5%, $Al_2O_3$ 1.5%, CaO 6.6%, MgO 3.0%, $Na_2O+K_2O$ 17%.

Experience shows that the new soft phosphate glasses may be used satisfactorily in joining together two parts in the silicate glass provided the whole of the silicate parts adjacent to the joint are kept warm (without softening them) and that a small hot flame is then applied locally to melt the soft phosphate glass. The phosphate glasses melt so rapidly that a joint can be made without distortion of the silicate glass parts.

There are some techniques of forming joints, however, where it is desirable to have a harder glass than the silicate glass referred to above but still of approximately the same expansion coefficient, so that joints may be made successfully with the new phosphate glasses. In such cases, glasses within the following range may be used: $Al_2O_3$ 15–23%; $Na_2O+K_2O$ 14–18%; CaO+MgO 15–21%; remainder mainly $SiO_2$. The percentage of MgO must be less than 11, and the ratio of $K_2O$ to $Na_2O$ must be less than 1.6 to avoid devitrification.

A preferred composition is as follows:

| | |
|---|---|
| $SiO_2$ | 45.5 |
| $Al_2O_3$ | 18.4 |
| CaO | 19.0 |
| $K_2O$ | 8.4 |
| $Na_2O$ | 8.7 |

The new phosphate glasses will seal to many ceramic materials, for example, mixtures of beryllium and magnesium oxides, and to many iron alloys containing Ni, Co and Cr, such as 26% Cr-Fe and 52% Ni-Fe alloys which possess a thermal expansion characteristic closely agreeing with that of the phosphate glasses above specified. Consequently parts for thermionic valves or similar devices may be constructed by sealing to electrode leads, beads of a phosphate glass of the character above specified and then sealing the leads into apertures formed in a base constituted of a silicate glass of the character above specified by way of the leads.

A further use of the new phosphate glasses is in joining together a metal part in various shapes such as plates, lamp caps, cups, etc., and a silicate glass part. The metal part may be for example a cylinder made of 26% Cr-Fe alloy, which could be joined to a cylinder in the bulb glass referred to above without any distortion of the glass cylinder.

Another use of the new phosphate glasses is in joining together a ceramic part for example a cylinder or plate made in a suitable mixture of magnesium and beryllium oxides to a silicate glass part, for example a cylinder in the bulb glass referred to above, without any distortion of the glass cylinder.

What I claim as new and desire to secure by Letters Patent of the United States is:

1. A glass composition comprising, by weight, about 28–38% $P_2O_5$, 8–16% $Al_2O_3$, 13–22% $B_2O_3$, 24–34% ZnO+MgO+BaO, and 6–10% $Na_2O$, the molecular ratio of $P_2O_5$ to $Al_2O_3$ being within the range 1.5 to 3.0.

2. A glass composition comprising, by weight, about 28–38% $P_2O_5$, 8–16% $Al_2O_3$, 13–22% $B_2O_3$, 24–34% ZnO+MgO+BaO, and 6–10% $Na_2O$, the molecular ratio of $P_2O_5$ to $Al_2O_3$ being within the range 1.5 to 3.0, and the ZnO content being about 3–9%, the MgO content 6–18%, and the BaO content 0–18%.

3. A glass composition consisting, by weight, of about 33.5% $P_2O_5$, 15.5% $Al_2O_3$, 14.0% $B_2O_3$, 12.4% MgO, 9.6% BaO, 7.0% ZnO, 8.0% $Na_2O$.

JOHN E. STANWORTH.